United States Patent
Yamamoto et al.

(10) Patent No.: US 10,598,062 B2
(45) Date of Patent: Mar. 24, 2020

(54) EXHAUST PURIFICATION SYSTEM OF INTERNAL COMBUSTION ENGINE

(71) Applicant: TOYOTA JIDOSHA KABUSHIKI KAISHA, Toyota-shi, Aichi-ken (JP)

(72) Inventors: Ryohei Yamamoto, Nishio (JP); Toshihiro Mori, Gotemba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 245 days.

(21) Appl. No.: 15/841,634

(22) Filed: Dec. 14, 2017

(65) Prior Publication Data

US 2018/0179934 A1 Jun. 28, 2018

(30) Foreign Application Priority Data

Dec. 27, 2016 (JP) ................................. 2016-253584
Feb. 17, 2017 (JP) ................................. 2017-028216

(51) Int. Cl.
*F01N 3/00* (2006.01)
*F01N 3/025* (2006.01)
*F01N 9/00* (2006.01)
*F01N 3/20* (2006.01)

(52) U.S. Cl.
CPC ......... *F01N 3/0253* (2013.01); *F01N 3/2033* (2013.01); *F01N 9/002* (2013.01); *F01N 2260/04* (2013.01); *F01N 2610/03* (2013.01); *F01N 2900/1404* (2013.01); *F01N 2900/1606* (2013.01); *Y02T 10/26* (2013.01); *Y02T 10/47* (2013.01)

(58) Field of Classification Search
CPC ....... F01N 9/002; F01N 3/0253; F01N 3/2033

USPC ............................................................ 60/295
See application file for complete search history.

(56) References Cited

U.S. PATENT DOCUMENTS

| | | | |
|---|---|---|---|
| 2002/0112472 A1 | 8/2002 | Tashiro et al. | |
| 2004/0200198 A1* | 10/2004 | Inoue .................... | F01N 3/023 55/282.3 |
| 2007/0209333 A1* | 9/2007 | Kondou ............ | B01D 46/0086 55/282.3 |
| 2010/0170227 A1* | 7/2010 | Tsukada ................... | E02F 9/00 60/286 |
| 2015/0192050 A1 | 7/2015 | Meier et al. | |
| 2015/0204224 A1 | 7/2015 | Daido et al. | |
| 2018/0179937 A1* | 6/2018 | Yamamoto ............ | F01N 3/0814 |

FOREIGN PATENT DOCUMENTS

| | | |
|---|---|---|
| EP | 1 388 647 A2 | 6/2003 |
| JP | H11-210442 A | 8/1999 |
| JP | 2013-124576 | 6/2013 |
| JP | 2014-051896 A | 3/2014 |

\* cited by examiner

*Primary Examiner* — Jason D Shanske
(74) *Attorney, Agent, or Firm* — Finnegan, Henderson, Farabow, Garrett & Dunner, LLP

(57) ABSTRACT

The exhaust purification system of an internal combustion engine 1 comprises: a catalyst 28 arranged in an exhaust passage 27 of the internal combustion engine, a fuel feed device 3, 35 feeding fuel to the catalyst, and a control device 80 configured to control the feed of fuel by the fuel feed device. The control device is configured to feed liquid state fuel from the fuel feed device to the catalyst when judging that a ratio of high viscosity components in particulate matter deposited on the catalyst is a predetermined value or less.

18 Claims, 13 Drawing Sheets

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the past has been an internal combustion engine provided in an exhaust passage with a filter for trapping particulate matter (PM) contained in exhaust gas so as to purify exhaust gas discharged from the combustion chambers. In such an internal combustion engine, fuel is made to oxidatively react in a catalyst provided at an upstream side of the filter, and the heat of reaction caused by the oxidation reaction is used to burn off the PM deposited on the filter as "processing for filter regeneration".

However, processing for filter regeneration can be performed when the internal combustion engine is in a predetermined operating state. For this reason, in the internal combustion engine described in PLT 1, in order to prevent the filter from being clogged by the PM while processing for filter regeneration cannot be performed, a liquid substance such as condensation water is fed to the PM on the filter.

CITATION LIST

Patent Literature

PLT 1: Japanese Patent Publication No. 2013-124576A

SUMMARY OF INVENTION

Technical Problem

However, PLT 1 does not mention that PM deposits on the catalyst. The inventors of the present application discovered as a result of intensive research that PM deposits even on catalysts. This phenomenon is believed to be based on a mechanism such as explained below.

For example, in processing for filter regeneration, fuel is fed to the catalyst to cause an oxidation reaction on the catalyst. However, at the upstream side end face of the catalyst, an oxidation reaction does not easily occur, and therefore the rise in temperature due to the heat of an oxidation reaction is small. Therefore, the heavy fractions of the fuel remain on the upstream side end face of the catalyst. The residual heavy fractions of the fuel oxidatively polymerize due to being exposed to the exhaust gas and change to high viscosity components. As a result, PM deposits on the upstream side end face of the catalyst through the fuel. If the processing for filter regeneration is repeated and the amount of deposition of PM on the catalyst increases, the PM will cause the catalyst to become clogged and the catalyst will decline in function.

Further, even if processing for filter regeneration is not performed, sometimes the fuel is fed to the catalyst. For example, if fuel is periodically injected from an exhaust fuel injector in order to prevent the injection port of the exhaust fuel injector injecting fuel into an exhaust passage of an internal combustion engine from being clogged by soot etc., the injected fuel is fed to the catalyst. Further, if the catalyst is an $NO_X$ storage and reduction catalyst (NSR catalyst), to remove the $NO_X$ stored in the catalyst by reduction, fuel is fed as a reducing agent. In these cases as well, PM deposits on the catalyst through the fuel by a similar principle.

Therefore, an object of the present invention is to provide an exhaust purification system of an internal combustion engine able to suppress clogging of a catalyst by PM.

Solution to Problem

The summary of the present disclosure is as follows.

(1) An exhaust purification system of an internal combustion engine comprising: a catalyst arranged in an exhaust passage of the internal combustion engine, a fuel feed device feeding fuel to the catalyst, and a control device configured to control the feed of fuel by the fuel feed device, wherein the control device is configured to feed liquid state fuel from the fuel feed device to the catalyst when judging that a ratio of high viscosity components in particulate matter deposited on the catalyst is a predetermined value or less.

(2) The exhaust purification system of an internal combustion engine described in above (1), wherein the control device is configured to detect or estimate a temperature of an inflowing exhaust gas flowing into the catalyst after judging that a predetermined amount or more of particulate matter has deposited on the catalyst, and judge that the ratio of high viscosity components in the particulate matter deposited on the catalyst is the predetermined value or less when a total of the time when the temperature of the inflowing exhaust gas is a predetermined reference temperature or more reaches a first threshold value.

(3) The exhaust purification system of an internal combustion engine described in above (2), wherein the control device is configured to calculate an average value of the temperature of the inflowing exhaust gas when the temperature of the inflowing exhaust gas is the reference temperature or more, and shorten the first threshold value when the average value is relatively high compared to when the average value is relatively low.

(4) The exhaust purification system of an internal combustion engine described in above (1), wherein the control device is configured to detect or estimate a temperature of an inflowing exhaust gas flowing into the catalyst after judging that a predetermined amount or more of particulate matter has deposited on the catalyst, calculate a heat feed amount from the temperature of the inflowing exhaust gas and a time when the temperature is maintained, and judge that the ratio of the high viscosity components in the particulate matter deposited on the catalyst is the predetermined value or less when the heat feed amount reaches a reference amount.

(5) The exhaust purification system of an internal combustion engine described in any one of above (1) to (4), wherein the control device is configured to detect or estimate a temperature of an inflowing exhaust gas flowing into the catalyst after judging that a predetermined amount or more of particulate matter has deposited on the catalyst, judge that the particulate matter has been removed from the catalyst and not feed liquid state fuel from the fuel feed device to the catalyst when a total of the time when the temperature of the inflowing exhaust gas is a combustion temperature of the particulate matter or more reaches a second threshold value.

(6) The exhaust purification system of an internal combustion engine described in any one of above (1) to (5), wherein the control device is configured to detect or estimate a temperature of an inflowing exhaust gas flowing into the catalyst and, if judging that the ratio of high viscosity components in the particulate matter deposited on the catalyst is the predetermined value or less, feed fuel from the fuel feed device to the catalyst when the temperature of the inflowing exhaust gas is a minimum boiling point of the fuel or less.

(7) The exhaust purification system of an internal combustion engine described in any one of above (1) to (6), wherein the fuel feed device is an exhaust fuel injector arranged in the exhaust passage at an upstream side of the catalyst in a direction of exhaust flow, and, if judging that the ratio of high viscosity components in the particulate matter deposited on the catalyst is the predetermined value or less, the control device is configured to feed fuel from the fuel feed device to the catalyst when the internal combustion engine is in an idling stop state or when it will be made the idling stop state.

(8) The exhaust purification system of an internal combustion engine described in any one of above (1) to (7), wherein the control device is configured to detect or estimate a temperature of an inflowing exhaust gas flowing into the catalyst, and, when feeding liquid state fuel from the fuel feed device to the catalyst, increase an feed amount of fuel when the temperature of the inflowing exhaust gas is relatively high compared to when the temperature of the inflowing exhaust gas is relatively low.

Advantageous Effects of Invention

According to the present invention, there is provided an exhaust purification system of an internal combustion engine able to suppress clogging of a catalyst by PM.

DESCRIPTION OF EMBODIMENTS

Figure 1:
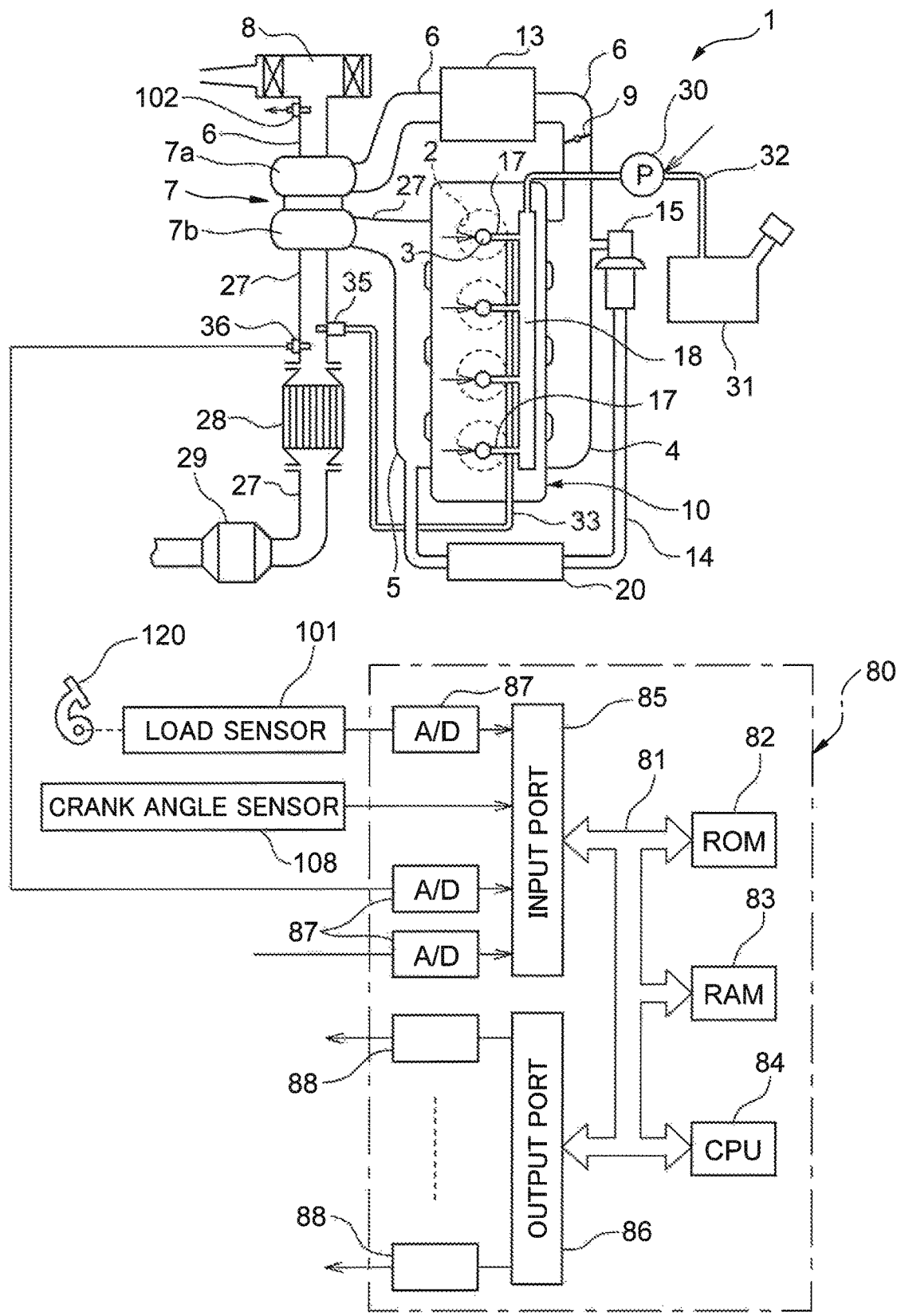
FIG. 1 is a view schematically showing an internal combustion engine in which an exhaust purification system of an internal combustion engine according to a first embodiment of the present invention is provided.

Below, referring to the drawings, embodiments of the present invention will be explained in detail. Note that, in the following explanation, similar component elements will be assigned the same reference numerals.

First Embodiment

Below, referring to FIG. 1 to FIG. 12, a first embodiment of the present invention will be explained.

<Explanation of Internal Combustion Engine as a Whole>

FIG. 1 is a view schematically showing an internal combustion engine in which an exhaust purification system of an internal combustion engine according to the first embodiment of the present invention is provided. The internal combustion engine 1 shown in FIG. 1 is a compression ignition type internal combustion engine (diesel engine). The internal combustion engine 1 is mounted in a vehicle.

Referring to FIG. 1, 10 indicates an engine body, 2 a combustion chamber of a cylinder, 3 an electronic control type cylinder fuel injector injecting fuel into the combustion chamber 2, 4 an intake manifold, and 5 an exhaust manifold. The intake manifold 4 is connected through an intake pipe 6 to an outlet of a compressor 7a of a turbocharger (supercharger) 7. An inlet of the compressor 7a is connected through the intake pipe 6 to an air cleaner 8. Inside the intake pipe 6, a throttle valve 9 is arranged. Further, around the intake pipe 6, an intercooler 13 is arranged so as to cool intake air flowing through the inside of the intake pipe 6. In the internal combustion engine 1, the engine cooling water is guided to the inside of the intercooler 13 where the engine cooling water is used to cool the intake air. The intake manifold 4 and intake pipe 6 form an intake passage for guiding air to the combustion chambers 2.

On the other hand, the exhaust manifold 5 is connected through an exhaust pipe 27 to an inlet of a turbine 7b of the turbocharger 7. The outlet of the turbine 7b is connected through the exhaust pipe 27 to a catalyst 28. The catalyst 28 is connected through the exhaust pipe 27 to a filter 29. The exhaust manifold 5 and exhaust pipe 27 form an exhaust passage for discharging exhaust gas produced by combustion of an air-fuel mixture in the combustion chambers 2.

The catalyst 28 is an oxidation catalyst (DOC) able to oxidize unburned fuel (HC, CO, etc.) in the exhaust gas. The catalyst 28 is arranged in the exhaust passage at the upstream side from the filter 29 in the direction of exhaust flow. Specifically, the catalyst 28 is arranged in the exhaust passage of the internal combustion engine 1 between the turbine 7b and the filter 29 in the exhaust pipe 27. The filter 29 traps the particulate matter (PM) contained in the exhaust gas. The filter 29 is for example a diesel particulate filter (DPF).

The exhaust manifold 5 and the intake manifold 4 are connected with each other through an exhaust gas recirculation (EGR) passage 14. Inside the EGR passage 14, an electronically controlled EGR control valve 15 is arranged. Further, around the EGR passage 14, an EGR cooling device 20 for cooling the EGR gas flowing through the inside of the EGR passage 14 is arranged. In the internal combustion engine 1, engine cooling water is guided into the EGR cooling device 20 where the engine cooling water is used to cool the EGR gas.

The fuel is fed by a fuel pump 30 from a fuel tank 31 through a fuel feed pipe 32 to the inside of a common rail 18. The fuel pump 30 pumps up the fuel inside the fuel tank 31 and raises the pressure of the fuel. The high pressure fuel fed into the common rail 18 is fed through the fuel feed lines 17 to the cylinder fuel injectors 3. Each cylinder fuel injector 3 injects fuel into the combustion chamber 2. The fuel is for example diesel fuel.

Further, each cylinder fuel injector 3 is connected to a leak fuel pipe 33. Among the fuel fed from the common rail 18 to the individual cylinder fuel injectors 3, the fuel not injected into the combustion chambers 2 is supplied through the leak fuel pipe 33 to the exhaust fuel injector 35.

Figure 2:
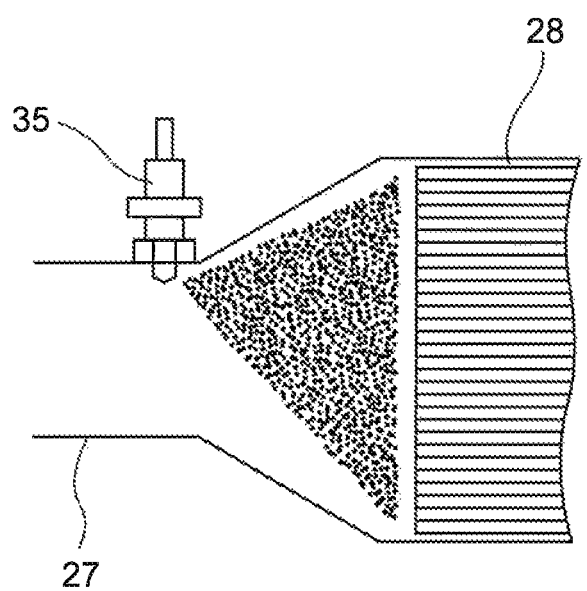
FIG. 2 is a view showing one example of a mode of injection of fuel by an exhaust fuel injector.

The exhaust fuel injector 35 is arranged in the exhaust passage at the upstream side of the catalyst 28 in the direction of exhaust flow. Specifically, the exhaust fuel injector 35 is fastened to the exhaust pipe 27 between the turbine 7b and catalyst 28 in the exhaust passage of the internal combustion engine 1. The exhaust fuel injector 35 is, for example, an electronically controlled injector similar to the cylinder fuel injectors 3. The exhaust fuel injector 35 injects fuel into the exhaust pipe 27 and feeds the fuel through the exhaust pipe 27 to the catalyst 28. For example, the exhaust fuel injector 35, as shown in FIG. 2, injects fuel toward the catalyst 28.

The various control operations of the internal combustion engine 1 are performed by an electronic control unit (ECU) 80. The ECU 80 is comprised of a digital computer provided with components connected with each other through bidirectional buses 81, such as a ROM (read only memory) 82, RAM (random access memory) 83, CPU (microprocessor) 84, input port 85, and output port 86. Outputs of a load sensor 101 and air flow meter 102 are input through corresponding AD converters 87 to the input port 85.

The load sensor 101 generates an output voltage proportional to the amount of depression of the accelerator pedal 120. Therefore, the load sensor 101 detects the engine load. The air flow meter 102 is arranged in the intake passage between the air cleaner 8 and the compressor 7a and detects the rate of flow of air flowing through the inside of the intake pipe 6. Further, the input port 85 is connected to a crank angle sensor 108 generating an output pulse every time a crankshaft rotates by for example 15°. The crank angle sensor 108 detects the engine speed.

On the other hand, the output port 86 is connected through corresponding drive circuits 88 to the cylinder fuel injectors 3, motor for driving throttle valve, EGR control valve 15, fuel pump 30, and exhaust fuel injector 35. The ECU 80 controls an injection timing and injection time of fuel injected from a cylinder fuel injector 3, an opening degree of the throttle valve 9, an opening degree of the EGR control valve 15, an operation of the fuel pump 30, and an injection timing and injection time of fuel injected from the exhaust fuel injector 35.

Note that, the internal combustion engine in which the exhaust purification system is provided may be a spark ignition type internal combustion engine (gasoline engine) in which spark plugs are arranged at the combustion chambers. Further, the specific configuration of the internal combustion engine such as the cylinder array, configuration of the intake and exhaust systems, and presence of any supercharger may differ from the configuration shown in FIG. 1.

For example, the fuel fed to the cylinder fuel injector 3 may be fed to the common rail 18 by an in-tank pump arranged inside the fuel tank 31 instead of by the fuel pump 30. Further, the fuel fed to the exhaust fuel injector 35 may be fed through a fuel pipe (not shown) directly connecting the fuel tank 31 to the exhaust fuel injector 35 without going through the fuel pipe 32 and leak fuel pipe 33. In this case, the leak fuel pipe 33 is omitted. Further, the fuel fed to the exhaust fuel injector 35 may be stored in a separate fuel tank from the fuel tank 31. The fuel is for example diesel fuel.

<Configuration of Exhaust Purification System of Internal Combustion Engine>

Below, the configuration of an exhaust purification system of the internal combustion engine 1 according to the first embodiment of the present invention will be explained. The exhaust purification system of the internal combustion engine 1 is provided with a filter 29, catalyst 28, fuel feed device feeding fuel to the catalyst 28, and control device controlling the feed of fuel by the fuel feed device. In the present embodiment, the exhaust fuel injector 35 corresponds to the fuel feed device, and the ECU 80 corresponds to the control device.

Note that, the fuel feed device may be the cylinder fuel injector 3 injecting fuel into the combustion chamber 2. The cylinder fuel injector 3 can feed unburned fuel to the catalyst 28 by injecting fuel in the expansion stroke at each cylinder as "post injection". In this case, the exhaust fuel injector 35 may be omitted.

<Deposition of PM on Catalyst>

In an exhaust purification system of an internal combustion engine 1, the PM in the exhaust gas is trapped by the filter 29 whereby the exhaust gas is purified. However, if the amount of the PM trapped by the filter 29 becomes greater, the filter 29 will clog and discharge of the exhaust gas through the filter 29 will be prevented. For this reason, PM trapped by the filter 29 has to be periodically removed.

In the present embodiment, to remove the PM trapped by the filter 29, the control device of the exhaust purification system performs processing for filter regeneration. In processing for filter regeneration, the fuel feed device feeds fuel to the catalyst 28 to thereby burn off the PM trapped by the filter 29. If feeding fuel to the catalyst 28, an oxidation reaction of the fuel occurs on the catalyst 28 and the temperature of the exhaust gas flowing into the filter 29 rises due to the heat of reaction. As a result, the temperature of the filter 29 rises and the PM trapped by the filter 29 is burned off.

However, if processing for filter regeneration is performed, the PM trapped by the filter 29 is removed, but PM deposits on the catalyst 28. This phenomenon is believed to be based on the mechanism explained below.

As explained above, in processing for filter regeneration, fuel is fed to the catalyst 28 to cause an oxidation reaction on the catalyst 28. However, at the upstream side (engine body 10 side) end face of the catalyst 28 an oxidation reaction does not easily occur, so the rise in temperature due to the heat of an oxidation reaction is small. Therefore, the heavy fractions of the fuel remain on the upstream side end face of the catalyst 28. The residual heavy fractions of the fuel oxidatively polymerize due to being exposed to the exhaust gas and change to high viscosity components. As a result, PM deposits on the upstream side end face of the catalyst 28 through the fuel. If the processing for filter regeneration is repeated and the amount of deposition of PM on the catalyst 28 increases, the PM will cause the catalyst 28 to become clogged and the catalyst 28 will decline in function.

Further, even if processing for filter regeneration is not performed, sometimes fuel is fed to the catalyst 28. For example, if fuel is periodically injected from the exhaust fuel injector 35 in order to prevent the injection port of the exhaust fuel injector 35 from being clogged by soot etc., the injected fuel is fed to the catalyst 28. Further, if the catalyst 28 is an $NO_X$ storage and reduction catalyst (NSR catalyst), to remove the $NO_X$ stored in the catalyst 28 by reduction, fuel is fed as a reducing agent from the exhaust fuel injector 35 or the cylinder fuel injector 3 to the catalyst 28. In these cases as well, PM deposits on the catalyst 28 through the fuel by a similar principle.

<Removal of PM on Catalyst>

For this reason, in the present embodiment, the control device of the exhaust purification system feeds liquid state fuel from the fuel feed device to the catalyst 28 to remove PM deposited on the catalyst 28. Below, the mechanism by which PM deposited on the catalyst 28 is removed by feeding liquid state fuel to the catalyst 28 will be explained.

Figure 3A:
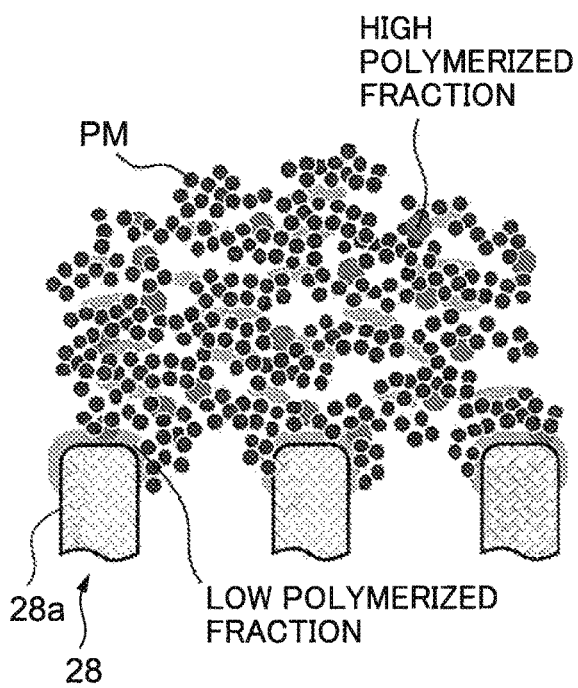
FIG. 3A is a view for explaining a mechanism by which PM is removed from a catalyst by feeding liquid state fuel.
Figure 3B:
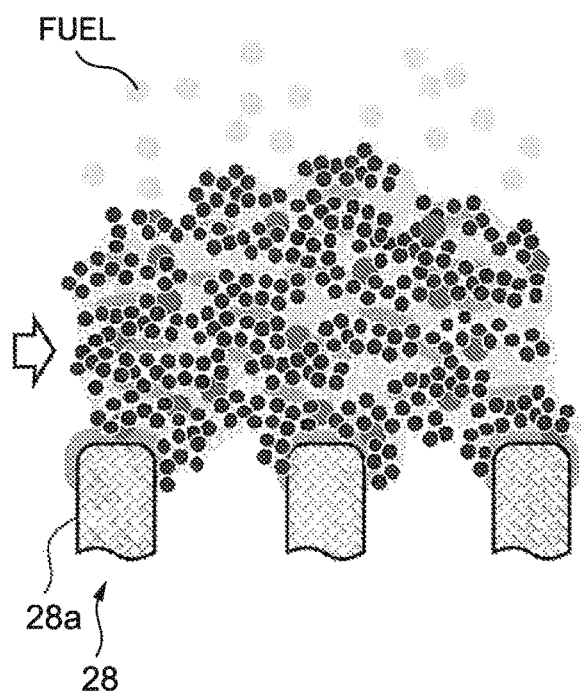
FIG. 3B is a view for explaining a mechanism by which PM is removed from a catalyst by feeding liquid state fuel.
Figure 3C:
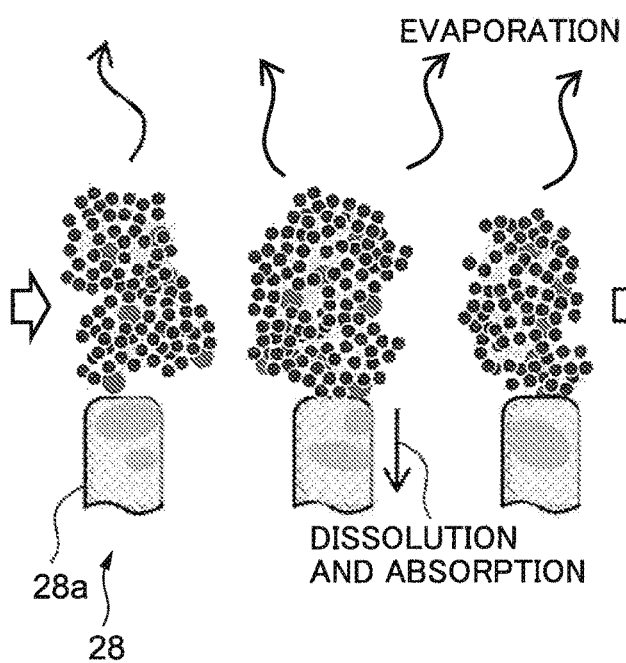
FIG. 3C is a view for explaining a mechanism by which PM is removed from a catalyst by feeding liquid state fuel.
Figure 3D:
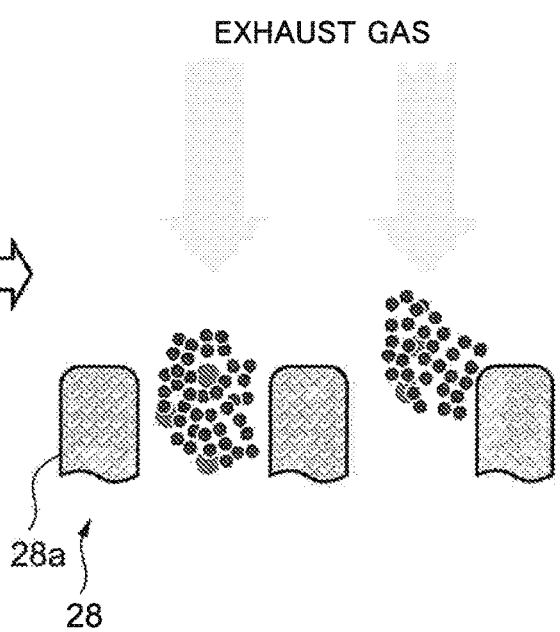
FIG. 3D is a view for explaining a mechanism by which PM is removed from a catalyst by feeding liquid state fuel.

FIGS. 3A to 3D are views for explaining the mechanism by which PM is removed from the catalyst 28 due to the feed of liquid state fuel. As shown in FIG. 3A, the heavy fractions of the fuel fed to the catalyst 28 change to a high viscosity high polymerized fraction and low polymerized fraction due to oxidative polymerization, and cause the PM in the exhaust gas to deposit on a base 28a of the catalyst 28. After that, as shown in FIG. 3B, the liquid state fuel is fed to the catalyst 28. If liquid state fuel is fed to the catalyst 28, the soluble organic fraction (SOF) in the PM dissolves in the fuel. As shown in FIG. 3C, the fuel in which the SOF is dissolved is absorbed at the base 28a of the catalyst 28 and evaporates due to the heat. Further, when the fuel in which the SOF is dissolved is absorbed in the base 28a of the catalyst 28, the liquid cross-linking force causes the PM to aggregate. The aggregated PM falls in adhesion with the base 28a. For this reason, after that, as shown in FIG. 3D, the aggregated PM is peeled off from the base 28a by the exhaust gas. Therefore, by feeding liquid state fuel, it is possible to remove PM from the catalyst 28.

Figure 4:
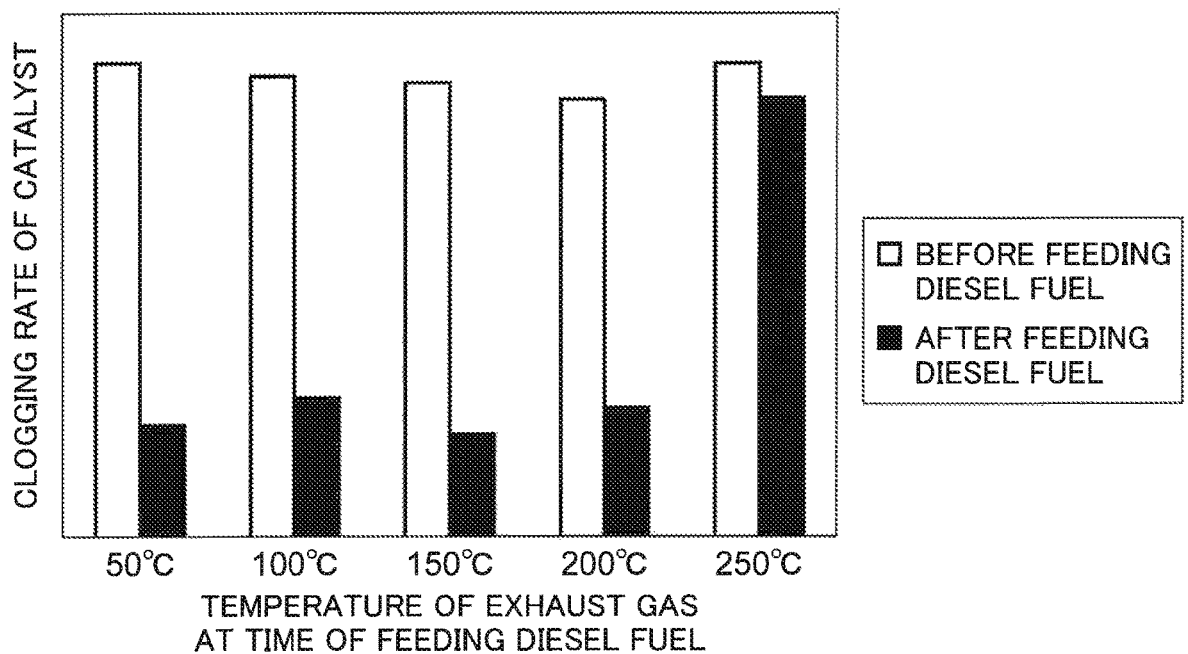
FIG. 4 is a graph showing a relationship between a temperature of exhaust gas at the time of feeding diesel fuel and a clogging rate of a catalyst.

The inventors of the present application performed the following experiments to confirm the effect of removal of PM by the feed of liquid state fuel. FIG. 4 is a graph showing a relationship between a temperature of exhaust gas at the time of feeding diesel fuel and a clogging rate of a catalyst. Note that, the temperature of the exhaust gas was measured at the upstream side of the catalyst in the direction of exhaust flow. In this experiment, diesel fuel was fed to the catalyst on which PM was deposited, then the clogging rate of the catalyst was measured before and after the feed of the diesel fuel. In five experiments, the temperature of the exhaust gas at the time of feed of diesel fuel was changed. The boiling point of diesel fuel differs for each of the ingredients contained in the diesel fuel, but in general is 200° C. to 350° C. As shown in the graph of FIG. 4, at a temperature of the minimum boiling point (200° C.) of the diesel fuel or less, the diesel fuel is fed to the catalyst in a liquid state, so the clogging rate of the catalyst greatly fell due to the feed of diesel fuel. On the other hand, at a temperature higher than the minimum boiling point of diesel fuel (250° C.), the diesel fuel is fed to the catalyst in the state of a gas-liquid mixture, so the clogging rate of the catalyst did not fall much at all due to the feed of diesel fuel.

Figure 5:
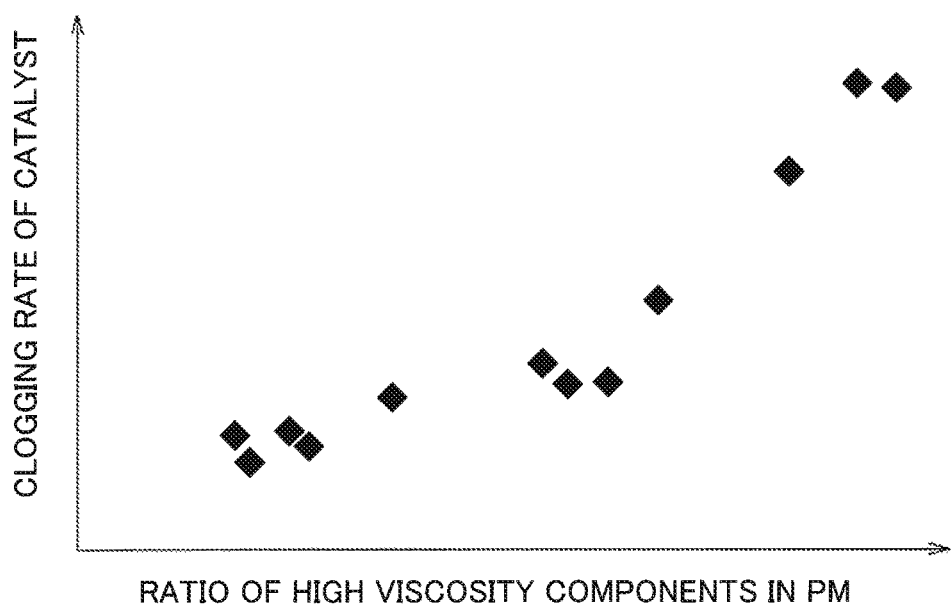
FIG. 5 is a map showing a relationship between a ratio of high viscosity components in PM deposited on a catalyst and a clogging rate of a catalyst.

FIG. 5 is a graph showing a relationship between a ratio of high viscosity components in PM deposited on a catalyst and a clogging rate of a catalyst. In this experiment, the ratio of the high viscosity components in the PM deposited on the catalyst were changed, and the clogging rate of the catalyst after feeding liquid state diesel fuel was measured. As shown in FIG. 5, the higher the ratio of the high viscosity components in the PM deposited on the catalyst, the higher the clogging rate of the catalyst became after feed of diesel fuel.

Figure 6:
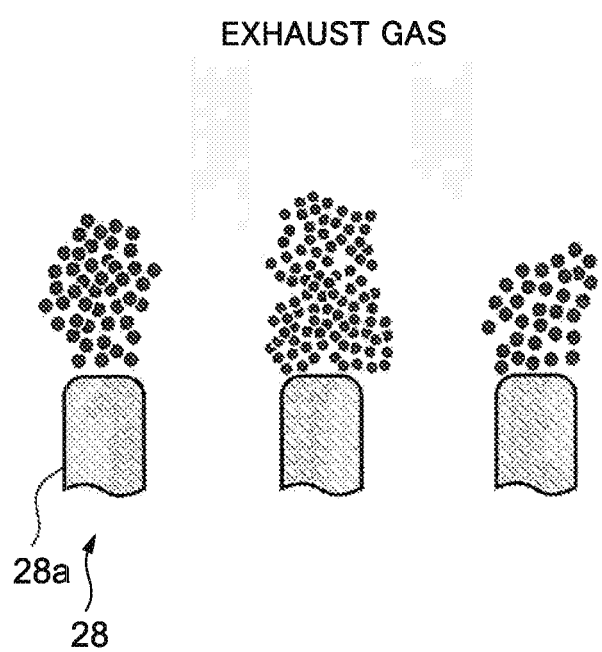
FIG. 6 is a view showing PM remaining on a base of a catalyst.

The reason is believed to be as follows: PM contains high viscosity components of soluble organic fractions (SOF). If the ratio of the SOF in the PM is high, the amount of SOF remaining in the PM without dissolving into the diesel fuel after feeding liquid state diesel fuel to the catalyst increases. As a result, the aggregated PM becomes higher in stickiness and, as shown in FIG. 6, part of the aggregated PM is not peeled off from the base 28a of the catalyst 28 by the exhaust gas and remains on the base 28a. For this reason, the higher the ratio of the high viscosity components in the PM deposited on the catalyst, the higher the clogging rate of the catalyst after feed of diesel fuel.

Figure 7:
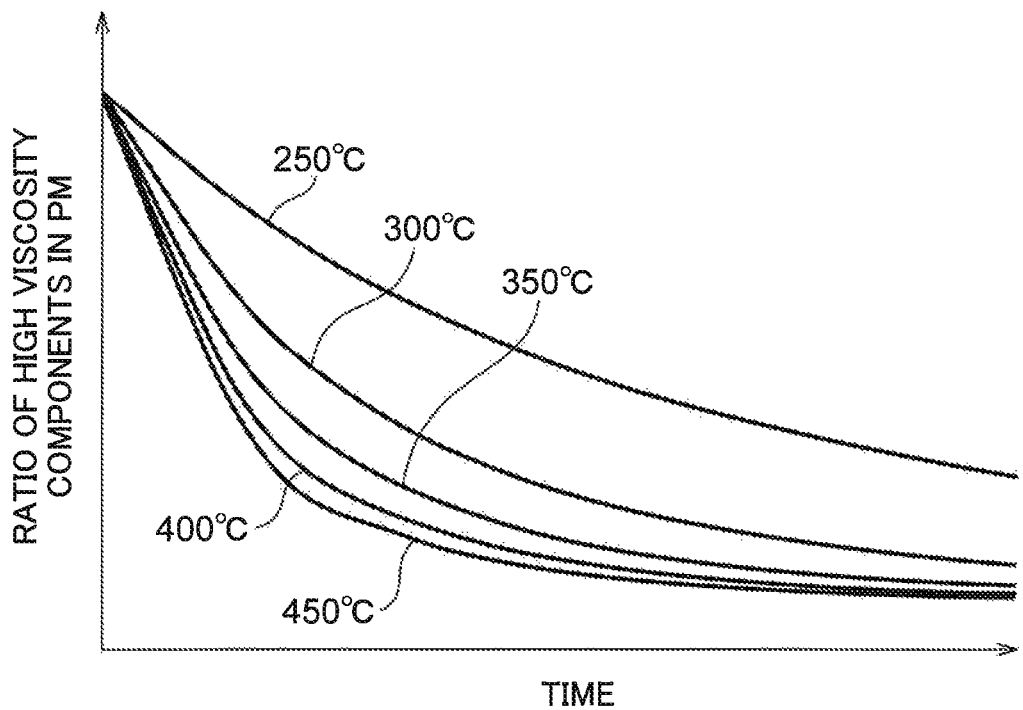
FIG. 7 is a graph showing a change along with time of a ratio of high viscosity components in PM when heat treating a catalyst on which PM is deposited.

FIG. 7 is a graph showing a change along with time of the ratio of high viscosity components in PM when heat treating a catalyst on which PM has deposited. In five experiments, the temperature of the heat treatment was changed. If the catalyst is heat treated by a high temperature (for example 250° C. or more), the SOF in the PM deposited on the catalyst is broken down by oxidation. For this reason, as shown in FIG. 7, the ratio of the SOF in the PM, that is, the ratio of the high viscosity components in the PM, falls due to the heat treatment of the catalyst. Therefore, by feeding liquid state diesel fuel after heat treating the catalyst, it is possible to promote the separation of PM from the catalyst.

Based on the above discoveries, the control device of the exhaust purification system feeds liquid state fuel from the fuel feed device to the catalyst 28 when judging that the ratio of the high viscosity components in the PM deposited on the catalyst 28 is a predetermined value or less. Due to this, it is possible to effectively strip off PM from the catalyst 28, so it is possible to keep the catalyst 28 from being clogged by the PM.

In the present embodiment, after judging that a predetermined amount or more of PM has deposited on the catalyst 28, the control device judges that the ratio of the high viscosity components in the PM deposited on the catalyst 28 is a predetermined value or less when the total of the time when the temperature of the exhaust gas flowing into the catalyst 28 (below, referred to as the "inflowing exhaust gas") is a reference temperature or more reaches a first threshold value. For example, the control device judges that a predetermined amount or more of PM has deposited on the catalyst 28 if fuel is fed from the fuel feed device to the catalyst 28 for a purpose other than removal of PM. Note that, the control device may judge that a predetermined amount or more of PM has deposited on the catalyst 28 if a predetermined time has elapsed from when fuel is fed from the fuel feed device to the catalyst 28 for a purpose other than removal of PM.

The control device detects or estimates the temperature of the inflowing exhaust gas as follows: For example, the control device uses an exhaust temperature sensor 36 arranged in the exhaust passage to detect the temperature of the inflowing exhaust gas. The exhaust temperature sensor 36 is arranged in the exhaust passage at the upstream side of the catalyst 28 in the direction of exhaust flow, specifically, is arranged in the exhaust pipe 27 between the exhaust fuel injector 35 and the catalyst 28. Further, the output of the exhaust temperature sensor 36 is input through the corresponding AD converter 87 to the input port 85 of the ECU 80.

Figure 8:
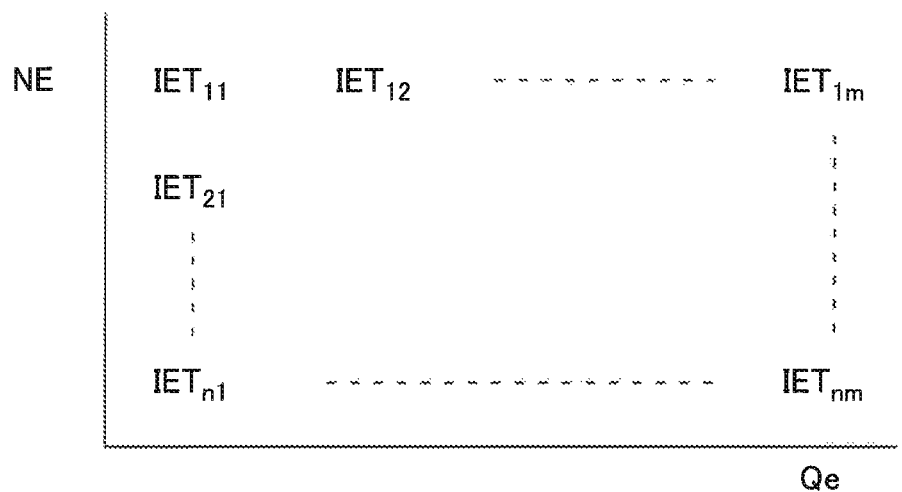
FIG. 8 is a map showing a relationship between a fuel injection amount from a cylinder fuel injector and engine speed, and a temperature of the inflowing exhaust gas.

Note that, the control device may use a map or calculation formula to estimate the temperature of the inflowing exhaust gas based on the amount of fuel injection from the cylinder fuel injector 3 and the engine speed. In this case, the exhaust temperature sensor 36 may be omitted from the internal combustion engine 1. The map or calculation formula is for example stored in the ROM 82 of the ECU 80. In the map, as shown in FIG. 8, the temperature of the inflowing exhaust gas IET is shown as a function of the amount of fuel injection Qe from the cylinder fuel injector 3 and the engine speed NE.

Further, the control device feeds fuel from the fuel feed device at the following timing so that liquid state fuel is fed from the fuel feed device. The control device feeds fuel from the fuel feed device to the catalyst 28 when the detected or estimated temperature of the inflowing exhaust gas is a minimum boiling point of the fuel or less. Note that, the control device may feed fuel from the fuel feed device to the catalyst 28 when the internal combustion engine 1 is in an idling stop state or will be made an idling stop state. In this case, as the fuel feed device, an exhaust fuel injector 35 is used. Note that, the "idling stop state" means the state where when the vehicle in which the internal combustion engine 1 is mounted is temporarily stopped, the feed of fuel to the combustion chamber 2 is stopped. In the idling stop state, high temperature exhaust gas produced by burning the air-fuel mixture is not discharged from the combustion chamber 2, so the fuel injected from the exhaust fuel injector 35 is fed in a liquid state to the catalyst 28.

Further, if the temperature of the inflowing exhaust gas is a combustion temperature of the PM or more, the PM deposited on the catalyst 28 is burned off by the exhaust gas. In this case, there is no need to remove PM from the catalyst 28 by feeding fuel. For this reason, the control device judges that PM has been removed from the catalyst 28 and need not feed liquid state fuel from the fuel feed device to the catalyst 28 when, after judging that PM has deposited on the catalyst 28, the total of the time when the detected or estimated temperature of the inflowing exhaust gas is the combustion temperature of the PM or more reaches a second threshold value. By doing this, it is possible to reduce the amount of fuel used for removing PM from the catalyst 28 and possible to improve the fuel efficiency of the internal combustion engine 1.

<Processing for Judgment of PM Deposition>

Figure 9:
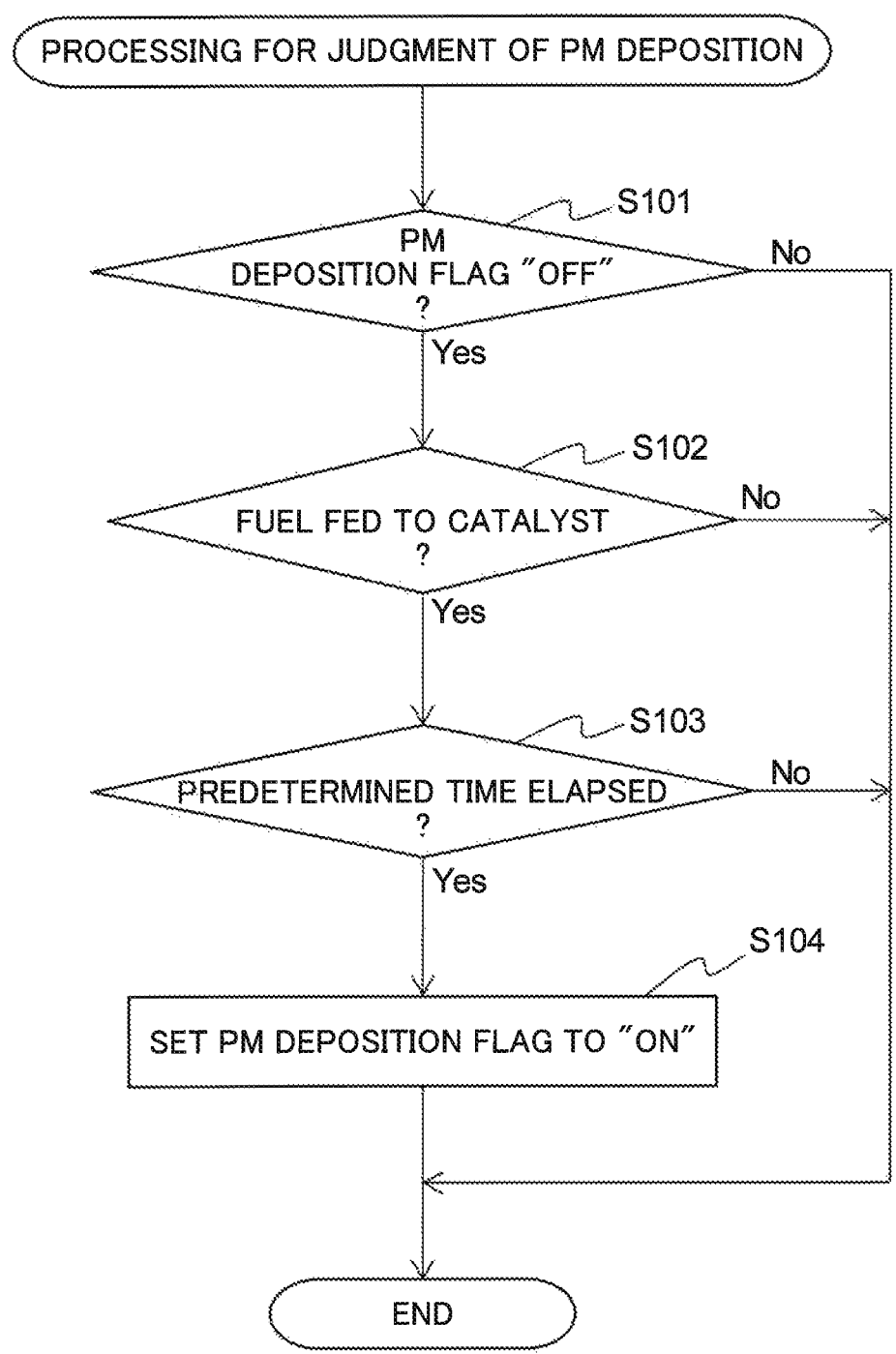
FIG. 9 is a flow chart showing a control routine for processing for judgment of PM deposition in a first embodiment of the present invention.

Below, referring to the flow chart, the above-mentioned control will be explained in detail. FIG. 9 is a flow chart showing a control routine of processing for judgment of PM deposition in the first embodiment of the present invention. The present control routine is repeatedly executed by the control device of the exhaust purification system (in the present embodiment, the ECU 80). In the present control routine, it is judged whether a predetermined amount or more of PM is deposited on the catalyst 28.

First, at step S101, the control device judges whether the PM deposition flag is "off". The PM deposition flag is a flag which is set to "on" when it is judged that a predetermined amount or more of PM is deposited on the catalyst 28. If at step S101 it is judged that the PM deposition flag is "on", the present control routine is ended. On the other hand, if at step S101 it is judged that the PM deposition flag is "off", the present control routine proceeds to step S102.

At step S102, the control device judges whether fuel has been fed from the fuel feed device to the catalyst 28 for a purpose other than removal of PM. For example, the control device judges that fuel has been fed from the fuel feed device to the catalyst 28 for a purpose other than removal of PM when executing processing for filter regeneration. Further, the control device judges that fuel has been fed from the fuel feed device to the catalyst 28 for a purpose other than removal of PM when feeding fuel from the fuel feed device to the catalyst 28 for preventing clogging of the injection port of the exhaust fuel injector 35 or for removing $NO_X$ by reduction.

If at step S102 it is judged that fuel has been fed from the fuel feed device to the catalyst 28 for a purpose other than removal of PM, the present control routine proceeds to step S103. At step S103, the control device judges whether a predetermined time has elapsed from when fuel was fed from the fuel feed device to the catalyst 28 for a purpose other than removal of PM.

If at step S103 it is judged that a predetermined time has elapsed, the present control routine proceeds to step S104. At step S104, the control device sets the PM deposition flag to "on". After step S104, the present control routine is ended.

Further, if at step S102 it is judged that fuel is not being fed from the fuel feed device to the catalyst 28 for a purpose other than removal of PM or if at step S103 it is judged that a predetermined time has not elapsed, the present control routine is ended. Note that step S103 may be omitted.

<Processing for Judgment of Fuel Feed Condition>

Figure 10:
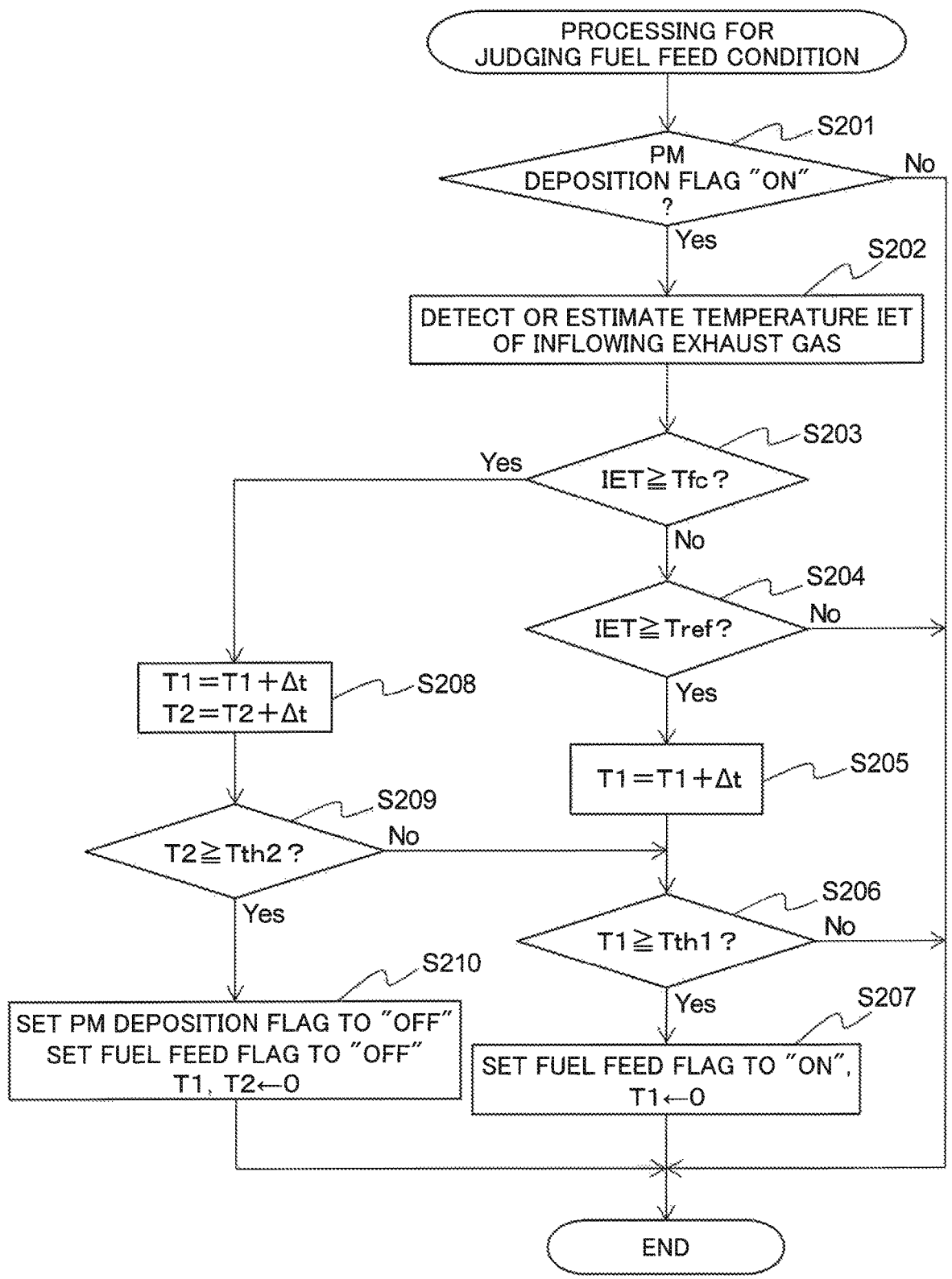
FIG. 10 is a flow chart showing a control routine for processing for judgment of a fuel feed condition in a first embodiment of the present invention.

FIG. 10 is a flow chart showing a control routine of processing for judgment of a fuel feed condition in the first embodiment of the present invention. The present control routine is repeatedly executed by the control device of the exhaust purification system (in the present embodiment, the ECU 80). In the present control routine, it is judged whether a condition for feeding liquid state fuel to the catalyst 28 is satisfied.

First, at step S201, the control device judges whether the PM deposition flag is "on". If it is judged that the PM deposition flag is "off", the present control routine is ended. On the other hand, if it is judged that the PM deposition flag is "on", the present control routine proceeds to step S202.

At step S202, the control device uses any of the above methods to detect or estimate the temperature of the inflowing exhaust gas IET. Next, at step S203, the control device judges whether the temperature of the inflowing exhaust gas IET is the combustion temperature Tfc of the PM or more. The combustion temperature Tfc of the PM is for example 500° C. If at step S203 it is judged that the temperature of the inflowing exhaust gas IET is less than the combustion temperature Tfc of the PM, the present control routine proceeds to step S204.

At step S204, the control device judges whether the temperature of the inflowing exhaust gas IET is the reference temperature Tref or more. The reference temperature Tref is the temperature of a boiling point of the SOF or more or the temperature of an activation temperature of the catalyst 28 or more and, for example, is 250° C. If at step S204 the temperature of the inflowing exhaust gas IET is less than the reference temperature Tref, the present control routine is ended. On the other hand, if at step S204 it is judged that the temperature of the inflowing exhaust gas IET is the reference temperature Tref or more, the present control routine proceeds to step S205.

At step S205, the control device updates a first cumulative time T1. The first cumulative time T1 is the total of the time when the temperature of the inflowing exhaust gas IET is maintained at the reference temperature Tref or more. The control device adds an incremental time Δt to the first cumulative time T1 and uses that value as the new first cumulative time T1. The incremental time Δt is a value corresponding to the interval of execution of the present control routine. The initial value of the first cumulative time T1 is zero.

Next, at step S206, the control device judges whether the first cumulative time T1 is a first threshold value Tth1 or more. The first threshold value Tth1 is a value predetermined so that the ratio of the high viscosity components in the PM becomes a predetermined value or less due to heat treatment. The predetermined value is for example a value of 25% or less, while the first threshold value Tth1 is for example a value of 10 minutes or more. Further, the first threshold value Tth1 may be set based on the temperature of the inflowing exhaust gas, the amount of PM, the fuel feed amount, etc., when fuel is fed from the fuel feed device to the catalyst 28 for a purpose other than removal of PM.

If at step S206 it is judged that the first cumulative time T1 is less than the first threshold value Tth1, the present control routine is ended. On the other hand, if at step S206 it is judged that the first cumulative time T1 is the first threshold value Tth1 or more, the present control routine proceeds to step S207. In this case, it is estimated that the ratio of the high viscosity components in the PM deposited on the catalyst 28 has reached a predetermined value or less. For this reason, at step S207, the control device sets the fuel feed flag to "on" and resets the first cumulative time T1 to zero. The fuel feed flag is a flag which is set to "on" when the condition for feeding liquid state fuel to the catalyst 28 is satisfied. After step S207, the present control routine is ended.

On the other hand, if at step S203 it is judged that the temperature of the inflowing exhaust gas IET is the combustion temperature Tfc or more, the present control routine proceeds to step S208. At step S208, the control device updates the first cumulative time T1 and second cumulative time T2. The second cumulative time T2 is the total of the time when the temperature of the inflowing exhaust gas IET is maintained at the combustion temperature Tfc or more. The control device adds an incremental time Δt to the first cumulative time T1 and uses the obtained value as the new first cumulative time T1, while adds an incremental time Δt to the second cumulative time T2 and uses the obtained value as the new second cumulative time T2. The incremental time Δt is a value corresponding to the interval of execution of the present control routine. The initial value of the second cumulative time T2 is zero.

Next, at step S209, the control device judges whether the second cumulative time T2 is a second threshold value Tth2 or more. The second threshold value Tth2 is a value predetermined so that the amount of PM on the catalyst 28 becomes less than a predetermined value due to burning of the PM. The second threshold value Tth2 is for example a value of 3 minutes or more.

If at step S209 it is judged that the second cumulative time T2 is the second threshold value Tth2 or more, the present control routine proceeds to step S210. In this case, it is estimated that the amount of PM on the catalyst 28 is less than a predetermined value. For this reason, at step S210, the control device sets the PM deposition flag and fuel feed flag to "off" and resets the first cumulative time T1 and second cumulative time T2 to zero. After step S210, the present control routine is ended.

On the other hand, if at step S209 it is judged that the second cumulative time T2 is less than the second threshold value Tth2, the present control routine proceeds to step S206. At step S206, the control device judges whether the first cumulative time T1 is the first threshold value Tth1 or more. If it is judged that the first cumulative time T1 is less than the first threshold value Tth1, the present control routine is ended. On the other hand, if it is judged that the first cumulative time T1 is the first threshold value Tth1 or more, the present control routine proceeds to step S207. At step S207, the control device sets the fuel feed flag "on" and resets the first cumulative time T1 to zero. After step S207, the present control routine is ended. Note that, step S203 and step S208 to step S210 may be omitted.

<Processing for PM Removal>

Figure 11:
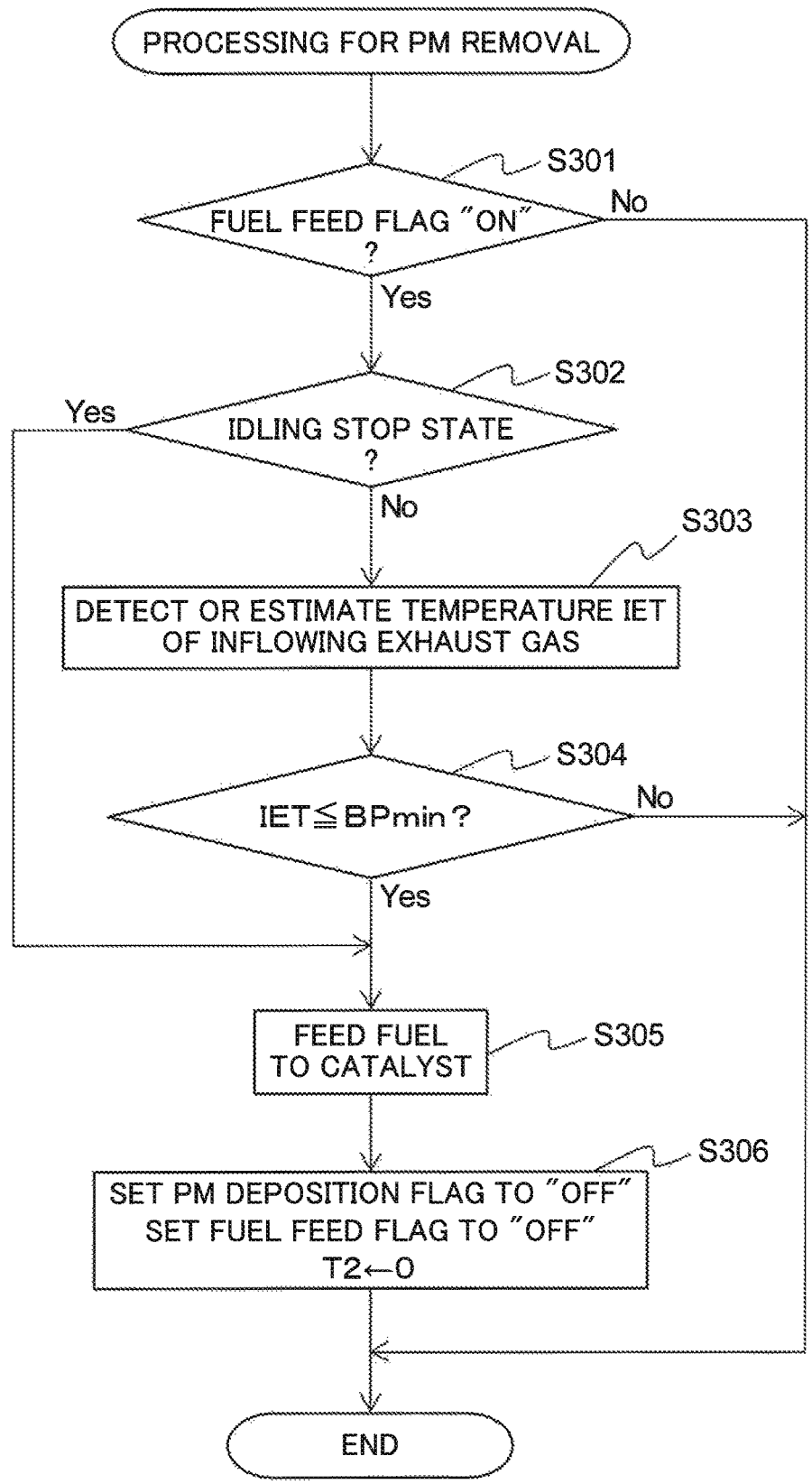
FIG. 11 is a flow chart showing a control routine for processing for PM removal in a first embodiment of the present invention.

FIG. 11 is a flow chart showing a control routine of processing for PM removal in the first embodiment of the present invention. The present control routine is repeatedly executed by the control device of the exhaust purification system (in the present embodiment, the ECU 80). In the present control routine, control is performed for removing the PM on the catalyst 28.

First, at step S301, the control device judges whether the fuel feed flag is "on". If it is judged that the fuel feed flag is "off", the present control routine is ended. On the other hand, if it is judged that the fuel feed flag is "on", the present control routine proceeds to step S302.

At step S302, the control device judges whether the internal combustion engine 1 is in the idling stop state or will be made the idling stop state. For example, the control device judges that the internal combustion engine 1 will be made the idling stop state if the vehicle in which the internal combustion engine 1 is mounted temporarily stops. If at step S302 it is judged that the internal combustion engine 1 is not in the idling stop state and will not be made the idling stop state, the present control routine proceeds to step S303.

At step S303, the control device uses any of the above methods to detect or estimate the temperature of the inflowing exhaust gas IET. Next, at step S304, the control device judges whether the temperature of the inflowing exhaust gas IET is the minimum boiling point BPmin of the fuel or less. The fuel is for example diesel fuel, and the minimum boiling point BPmin of the fuel is for example 200° C.

If at step S304 it is judged that the temperature of the inflowing exhaust gas IET is higher than the minimum boiling point BPmin of the fuel, liquid state fuel cannot be fed to the catalyst 28, so the present control routine is ended. On the other hand, if it is judged that the temperature of the inflowing exhaust gas is the minimum boiling point BPmin of the fuel or less, the present control routine proceeds to step S305. Further, if it is judged at step S102 that the internal combustion engine 1 is in the idling stop state or will be made the idling stop state, the present control routine skips step S303 and step S304 and proceeds to step S305.

At step S305, the control device feeds fuel from the fuel feed device to the catalyst 28. At this time, liquid state fuel is fed to the catalyst 28. The feed amount of fuel is, for example, set to 0.03 ml/cm$^2$ to 0.06 ml/cm$^2$ per unit area of the catalyst 28. By doing this, it is possible to keep the fuel efficiency of the internal combustion engine 1 from deteriorating while removing the PM from the catalyst 28.

Figure 12:
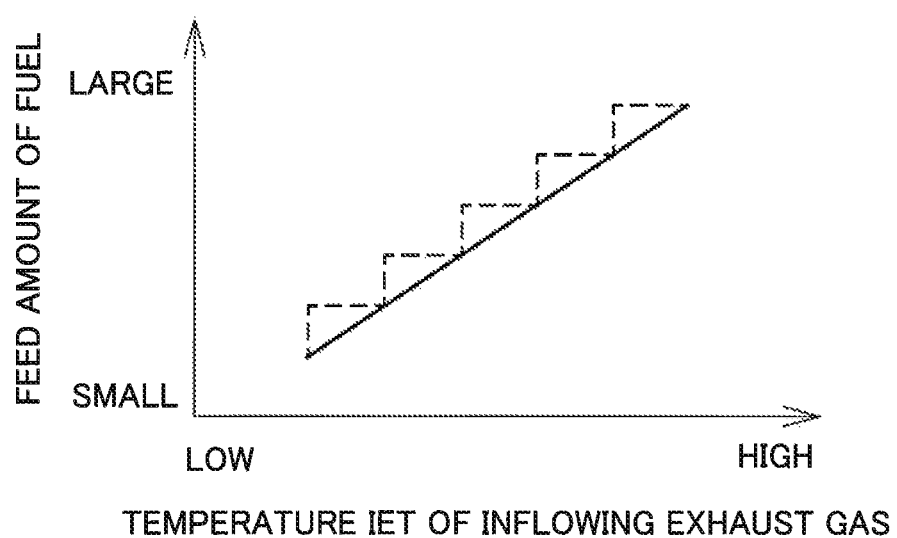
FIG. 12 is a map showing a relationship between a fuel feed amount and a temperature of the inflowing exhaust gas.

Note that, the control device may increase the feed amount of fuel when the temperature of the inflowing exhaust gas IET is relatively high compared to when the temperature of the inflowing exhaust gas IET is relatively low. By doing this, it is possible to feed the amount of fuel required for removing the PM to the catalyst 28 in the liquid state regardless of the temperature of the inflowing exhaust gas IET. For example, the control device uses the map such as shown in FIG. 12 to set the feed amount of fuel. In this map, the feed amount of fuel is shown as a function of the temperature of the inflowing exhaust gas IET. As shown in FIG. 12 by the solid line, the feed amount of fuel is made linearly greater as the temperature of the inflowing exhaust gas IET becomes higher. Note that, the feed amount of fuel, as shown in FIG. 12 by the broken line, may be made greater in stages (in steps) as the temperature of the inflowing exhaust gas IET becomes higher.

Next, at step S306, the control device sets the PM deposition flag and fuel feed flag to "off" and resets the second cumulative time T2 to zero. After step S306, the present control routine is ended. Note that, at step S302 or step S303 and step S304 may be omitted.

Second Embodiment

The exhaust purification system of an internal combustion engine according to a second embodiment is basically similar to the exhaust purification system of an internal combustion engine according to the first embodiment except for the points explained below. For this reason, below, the second embodiment of the present invention will be explained focusing on the parts different from the first embodiment.

As shown in FIG. 7, the ratio of the high viscosity components in the PM deposited on the catalyst 28 greatly falls due to the heat treatment the higher the temperature of the heat treatment. For this reason, the heat treatment time required for making the ratio of the high viscosity components in the PM a predetermined value or less becomes shorter the higher the temperature of the inflowing exhaust gas.

Therefore, in the second embodiment, the control device of the exhaust purification system performs the following control. The control device, in the same way as the first embodiment, judges that the ratio of the high viscosity components in the PM deposited on the catalyst 28 is a predetermined value or less and feeds liquid state fuel from the fuel feed device to the catalyst 28 when the total of the time when the temperature of the inflowing exhaust gas is the reference temperature or more reaches the first threshold value. Furthermore, the control device calculates the average value of the temperature of the inflowing exhaust gas when the temperature of the inflowing exhaust gas is the reference temperature or more, and shortens the first threshold value when the average value is relatively high compared to when the average value is relatively low. By doing this, it is possible to feed liquid state fuel to the catalyst 28 at a more suitable timing, and removal of the PM on the catalyst 28 by the feed of fuel is promoted. Note that, the temperature of the inflowing exhaust gas is detected or estimated by a method similar to the first embodiment.

<Processing for Judging Fuel Feed Condition>

Figure 13:
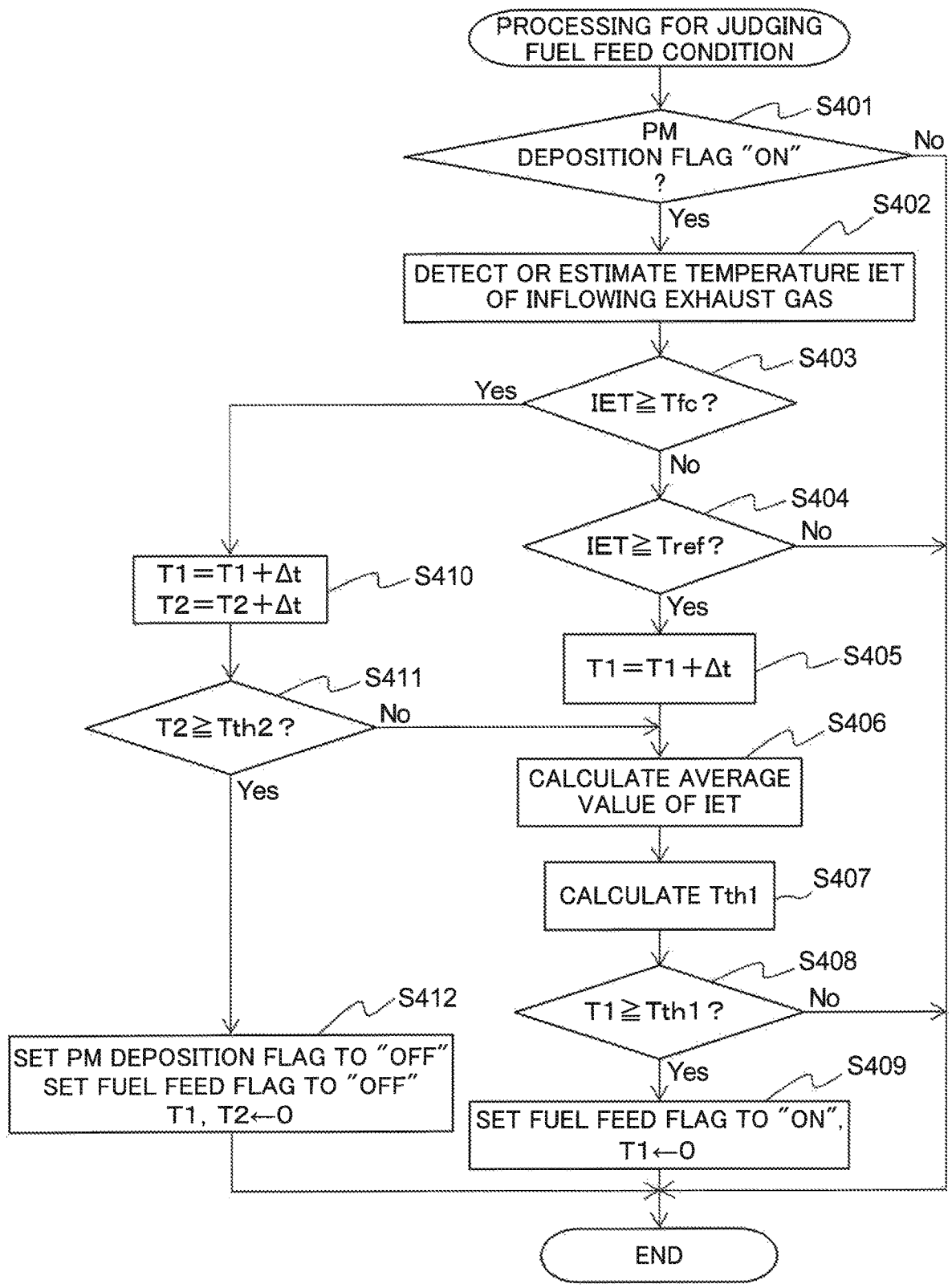
FIG. 13 is a flow chart showing a control routine for processing for judgment of a fuel feed condition in a second embodiment of the present invention.

FIG. 13 is a flow chart showing a control routine for processing for judgment of a fuel feed condition in the second embodiment of the present invention. The present control routine is repeatedly executed by the control device of the exhaust purification system (in the present embodiment, the ECU 80). In the present control routine, it is judged whether a condition for feeding liquid state fuel to the catalyst 28 is satisfied.

Step S401 to step S405 and step S410 to step S412 are similar to step S201 to step S205 and step S208 to step S210 in FIG. 10, so explanations will be omitted.

If at step S411 it is judged that the second cumulative time T2 is less than the second threshold value Tth2 or after step S405, the present control routine proceeds to step S406. At step S406, the control device calculates the average value of the temperature of the inflowing exhaust gas IET when the temperature of the inflowing exhaust gas IET is the reference temperature Tref or more.

Figure 14:
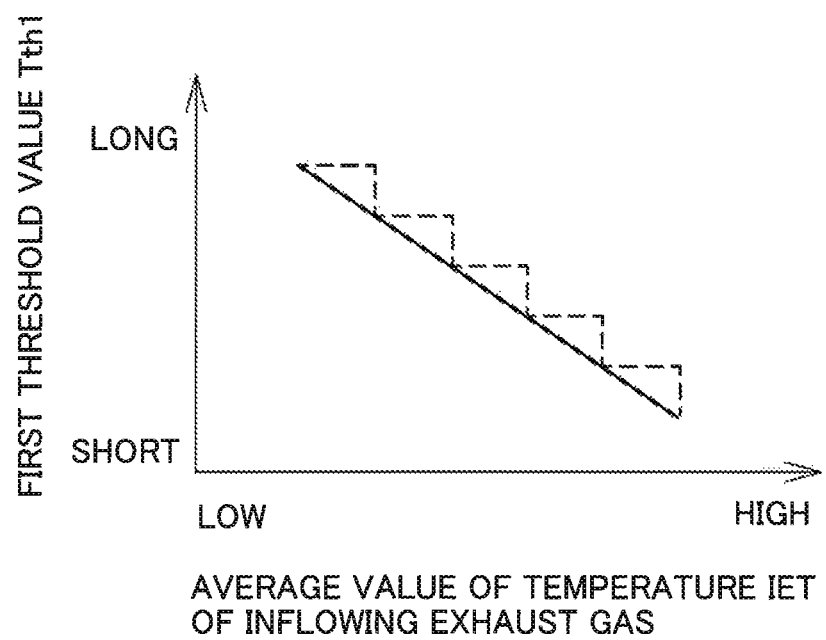
FIG. 14 is a map showing a relationship between a first threshold value and an average value of a temperature of inflowing exhaust gas.

Next, at step S407, the control device calculates the first threshold value Tth1 based on the average value calculated at step S406. Specifically, the control device shortens the first threshold value Tth1 more when the average value is relatively high compared to when the average value is relatively low. For example, the control device uses the map such as shown in FIG. 14 to set the first threshold value Tth1. In this map, the first threshold value Tth1 is shown as a function of the average value of the temperature of the inflowing exhaust gas IET. As shown in FIG. 14 by the solid line, the first threshold value Tth1 is made shorter linearly as the average value of the temperature of the inflowing exhaust gas IET becomes higher. Note that, the first threshold value Tth1, as shown in FIG. 12 by the broken line, may be made shorter in stages (in steps) as the average value of the temperature of the inflowing exhaust gas IET becomes higher.

Next, at step S408, the control device judges whether the first cumulative time T1 is a first threshold value Tth1 or more. The first threshold value Tth1 is the value calculated at step S407. If at step S408 it is judged that the first cumulative time T1 is less than the first threshold value Tth1, the present control routine is ended. On the other hand, if at step S408 it is judged that the first cumulative time T1 is the first threshold value Tth1 or more, the present control routine proceeds to step S409. At step S409, the control device sets the fuel feed flag to "on" and resets the first cumulative time T1 to zero. After step S409, the present control routine is ended.

Note that, in the second embodiment as well, in the same way as the first embodiment, processing for judgment of PM deposition of FIG. 9 and processing for PM removal of FIG. 11 are performed.

Third Embodiment

The exhaust purification system of an internal combustion engine according to a third embodiment is basically similar to the exhaust purification system of an internal combustion engine according to the first embodiment except for the points explained below. For this reason, below, the third embodiment of the present invention will be explained focusing on the parts different from the first embodiment.

The greater the amount of heat fed to the catalyst 28 where PM has deposited, the greater the amount of SOF in the PM which is broken down by oxidation and the lower the ratio of the high viscosity components in the PM. For this reason, in the third embodiment, the control device of the exhaust purification system performs the following control. After judging that a predetermined amount or more of PM has deposited on the catalyst 28, the control device calculates the feed amount of heat from the temperature of the inflowing exhaust gas and the time when the temperature was maintained. If the heat feed amount has reached a reference amount, the control device judges that the ratio of the high viscosity components in the PM deposited on the catalyst 28 is a predetermined value or less and feeds liquid state fuel from the fuel feed device to the catalyst 28. By doing this, it is possible to feed fuel to the catalyst 28 at a more suitable timing, and removal of the PM on the catalyst 28 by the feed of fuel is promoted.

<Processing for Judging Fuel Feed Condition>

Figure 15:
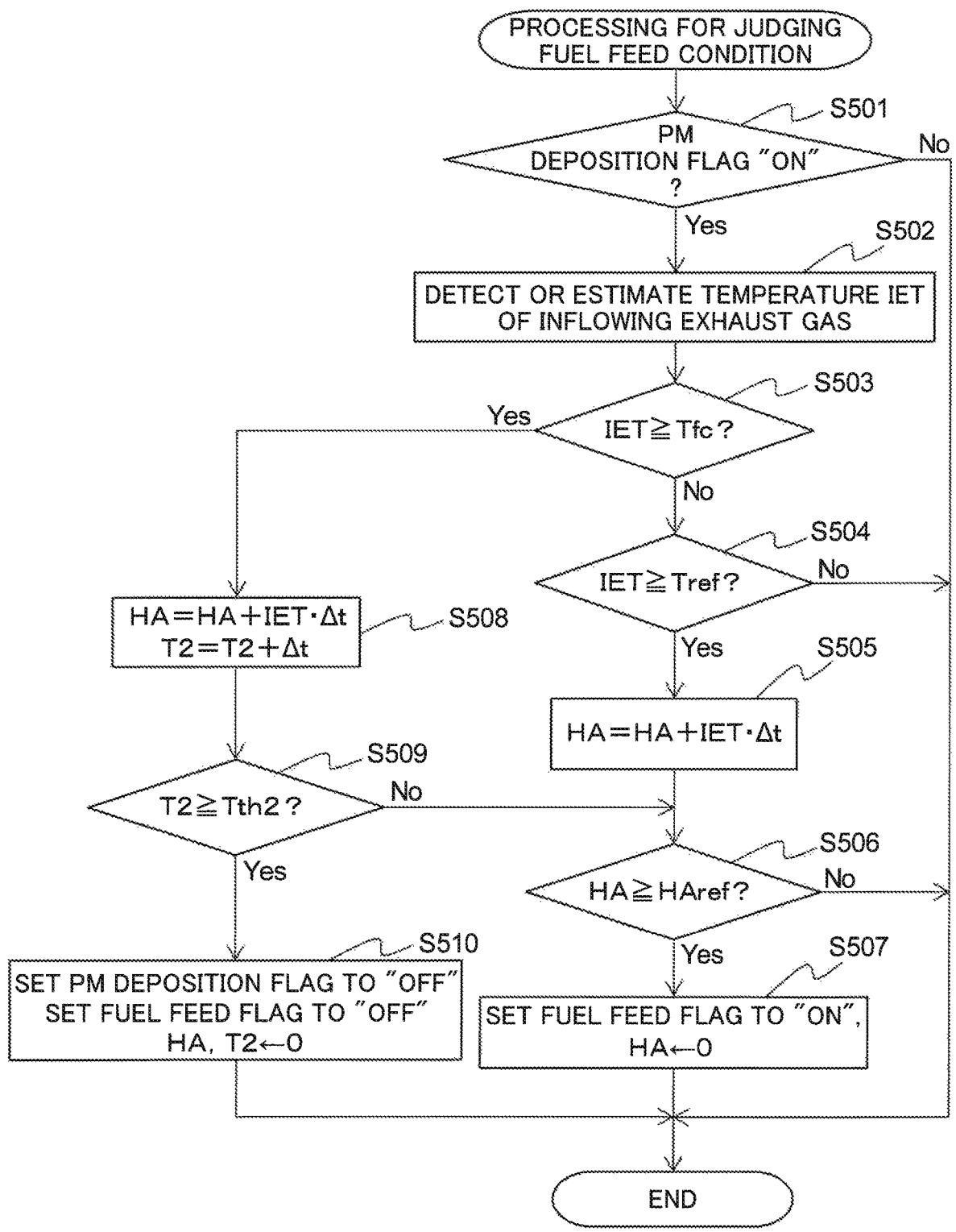
FIG. 15 is a flow chart showing a control routine for processing for judgment of a fuel feed condition in a third embodiment of the present invention.

FIG. 15 is a flow chart showing a control routine for processing for judgment of a fuel feed condition in the third embodiment of the present invention. The present control routine is repeatedly executed by the control device of the exhaust purification system (in the present embodiment, the ECU 80). In the present control routine, it is judged whether a condition for feeding liquid state fuel to the catalyst 28 is satisfied.

Step S501 to step S504 and step S509 are similar to step S201 to step S204 and step S209 in FIG. 10, so explanations will be omitted.

If at step S504 it is judged that the temperature of the inflowing exhaust gas IET is the reference temperature Tref or more, the present control routine proceeds to step S505. At step S505, the control device updates the heat feed amount HA. The heat feed amount HA is a value correlated with the total of the amount of heat fed to the catalyst 28 by the inflowing exhaust gas. For example, the control device multiplies the temperature of the inflowing exhaust gas IET with an incremental time $\Delta t$ and adds the obtained value to the heat feed amount HA for use as the new heat feed amount HA. The incremental time $\Delta t$ is a value corresponding to the interval of execution of the present control routine. The initial value of the heat feed amount HA is zero.

Further, if at step S503 it is judged that the temperature of the inflowing exhaust gas IET is the combustion temperature Tfc of the PM or more, the present control routine proceeds to step S508. At step S508, the control device updates the heat feed amount HA and the second threshold value Tth2.

If at step S509 it is judged that the second cumulative time T2 is less than the second threshold value Tth2 or after step S505, the present control routine proceeds to step S506. At step S506, the control device judges whether the heat feed amount HA is the reference amount HAref or more. The reference amount HAref is a value predetermined so that the ratio of the high viscosity components in the PM becomes a predetermined value or less by heat treatment. The predetermined value is for example a value of 25% or less. Further, the reference amount HAref may be set based on the temperature of the inflowing gas, the amount of PM, the fuel feed amount, etc., when fuel is fed from the fuel feed device to the catalyst 28 for purposes other than removing PM.

If at step S506 it is judged that the heat feed amount HA is less than the reference amount HAref, the present control routine is ended. On the other hand, if at step S506 it is judged that the heat feed amount HA is the reference amount HAref or more, the present control routine proceeds to step S507. At step S507, the control device sets the fuel feed flag to "on" and resets the heat feed amount HA to zero. After step S507, the present control routine is ended.

Further, if at step S509 it is judged that the second cumulative time T2 is the second threshold value Tth2 or more, the present control routine proceeds to step S510. At step S510, the control device sets the PM deposition flag and fuel feed flag to "off" and resets the heat feed amount HA and second cumulative time T2 to zero. After step S510, the present control routine is ended.

Note that, in the third embodiment as well, in the same way as the first embodiment, processing for judgment of PM deposition of FIG. 9 and processing for PM removal of FIG. 11 are performed.

Above, preferred embodiments of the present invention were explained, but the present invention is not limited to these embodiments and can be corrected and changed in various ways within the language of the claims. For example, the catalyst may be supported on the filter. Specifically, the catalyst may be coated on the surface of the filter and be integral with the filter. Further, the filter may be omitted. Further, the fuel fed from the fuel feed device may be fuel other than diesel fuel such as biodiesel fuel.

REFERENCE SIGN LIST

1. internal combustion engine
3. cylinder fuel injector
27. exhaust pipe
28. catalyst
29. filter
35. exhaust fuel injector
80. electronic control unit (ECU)

The invention claimed is:

1. An exhaust purification system of an internal combustion engine comprising:
    a filter arranged in an exhaust passage of the internal combustion engine and trapping particulate matter contained in exhaust gas,
    an oxidation catalyst arranged in the exhaust passage at an upstream side from the filter in a direction of exhaust flow,
    a fuel feed device comprising one or more of an exhaust fuel injector and a cylinder fuel injector feeding fuel to the oxidation catalyst, and
    a control device configured to control the feed of fuel by the fuel feed device, wherein the control device is configured to feed liquid state fuel from the fuel feed device to the oxidation catalyst so as to remove particulate matter deposited on the oxidation catalyst when judging that a percentage of soluble organic fractions (SOF) in particulate matter deposited on the oxidation catalyst is a predetermined value or less.

2. The exhaust purification system of an internal combustion engine according to claim 1, wherein the control device is configured to detect or estimate a temperature of an inflowing exhaust gas flowing into the catalyst after judging that a predetermined amount or more of particulate matter has deposited on the catalyst, and judge that the percentage of soluble organic fractions (SOF) in the particulate matter deposited on the catalyst is the predetermined value or less when a total of the time when the temperature of the inflowing exhaust gas is a predetermined reference temperature or more reaches a first threshold value.

3. The exhaust purification system of an internal combustion engine according to claim 2, wherein the control device is configured to calculate an average value of the temperature of the inflowing exhaust gas when the temperature of the inflowing exhaust gas is the reference temperature or more, and shorten the first threshold value when the average value is relatively higher as compared to when the average value is relatively lower.

4. The exhaust purification system of an internal combustion engine according to claim 1, wherein the control device is configured to detect or estimate a temperature of an inflowing exhaust gas flowing into the catalyst after judging that a predetermined amount or more of particulate matter has deposited on the catalyst, calculate a heat feed amount from the temperature of the inflowing exhaust gas and a time when the temperature is maintained, and judge that the percentage of soluble organic fractions (SOF) in the particulate matter deposited on the catalyst is the predetermined value or less when the heat feed amount reaches a reference amount.

5. The exhaust purification system of an internal combustion engine according to claim 1, wherein the control device is configured to detect or estimate a temperature of an inflowing exhaust gas flowing into the catalyst after judging that a predetermined amount or more of particulate matter has deposited on the catalyst, judge that the particulate matter has been removed from the catalyst and not feed liquid state fuel from the fuel feed device to the catalyst when a total of the time when the temperature of the inflowing exhaust gas is a combustion temperature of the particulate matter or more reaches a second threshold value.

6. The exhaust purification system of an internal combustion engine according to claim 2, wherein the control device is configured to detect or estimate a temperature of an inflowing exhaust gas flowing into the catalyst after judging that a predetermined amount or more of particulate matter has deposited on the catalyst, judge that the particulate matter has been removed from the catalyst and not feed liquid state fuel from the fuel feed device to the catalyst when a total of the time when the temperature of the inflowing exhaust gas is a combustion temperature of the particulate matter or more reaches a second threshold value.

7. The exhaust purification system of an internal combustion engine according to claim 3, wherein the control device is configured to detect or estimate a temperature of an inflowing exhaust gas flowing into the catalyst after judging that a predetermined amount or more of particulate matter has deposited on the catalyst, judge that the particulate matter has been removed from the catalyst and not feed liquid state fuel from the fuel feed device to the catalyst when a total of the time when the temperature of the inflowing exhaust gas is a combustion temperature of the particulate matter or more reaches a second threshold value.

8. The exhaust purification system of an internal combustion engine according to claim 4, wherein the control device is configured to detect or estimate a temperature of an inflowing exhaust gas flowing into the catalyst after judging that a predetermined amount or more of particulate matter has deposited on the catalyst, judge that the particulate matter has been removed from the catalyst and not feed liquid state fuel from the fuel feed device to the catalyst when a total of the time when the temperature of the inflowing exhaust gas is a combustion temperature of the particulate matter or more reaches a second threshold value.

9. The exhaust purification system of an internal combustion engine according to claim 1, wherein the control device is configured to detect or estimate a temperature of an inflowing exhaust gas flowing into the catalyst and, if judging that the percentage of soluble organic fractions (SOF) in the particulate matter deposited on the catalyst is the predetermined value or less, feed fuel from the fuel feed device to the catalyst when the temperature of the inflowing exhaust gas is a minimum boiling point of the fuel or less.

10. The exhaust purification system of an internal combustion engine according to claim 2, wherein the control device is configured to detect or estimate a temperature of an inflowing exhaust gas flowing into the catalyst and, if judging that the percentage of soluble organic fractions (SOF) in the particulate matter deposited on the catalyst is the predetermined value or less, feed fuel from the fuel feed device to the catalyst when the temperature of the inflowing exhaust gas is a minimum boiling point of the fuel or less.

11. The exhaust purification system of an internal combustion engine according to claim 3, wherein the control device is configured to detect or estimate a temperature of an inflowing exhaust gas flowing into the catalyst and, if judging that the percentage of soluble organic fractions (SOF) in the particulate matter deposited on the catalyst is the predetermined value or less, feed fuel from the fuel feed device to the catalyst when the temperature of the inflowing exhaust gas is a minimum boiling point of the fuel or less.

12. The exhaust purification system of an internal combustion engine according to claim 4, wherein the control device is configured to detect or estimate a temperature of an inflowing exhaust gas flowing into the catalyst and, if judging that the percentage of soluble organic fractions (SOF) in the particulate matter deposited on the catalyst is the predetermined value or less, feed fuel from the fuel feed device to the catalyst when the temperature of the inflowing exhaust gas is a minimum boiling point of the fuel or less.

13. The exhaust purification system of an internal combustion engine according to claim 5, wherein the control device is configured to detect or estimate a temperature of an inflowing exhaust gas flowing into the catalyst and, if judging that the percentage of soluble organic fractions (SOF) in the particulate matter deposited on the catalyst is the predetermined value or less, feed fuel from the fuel feed device to the catalyst when the temperature of the inflowing exhaust gas is a minimum boiling point of the fuel or less.

14. The exhaust purification system of an internal combustion engine according to claim 6, wherein the control device is configured to detect or estimate a temperature of an inflowing exhaust gas flowing into the catalyst and, if judging that the percentage of soluble organic fractions (SOF) in the particulate matter deposited on the catalyst is the predetermined value or less, feed fuel from the fuel feed device to the catalyst when the temperature of the inflowing exhaust gas is a minimum boiling point of the fuel or less.

15. The exhaust purification system of an internal combustion engine according to claim 7, wherein the control device is configured to detect or estimate a temperature of an inflowing exhaust gas flowing into the catalyst and, if judging that the percentage of soluble organic fractions (SOF) in the particulate matter deposited on the catalyst is the predetermined value or less, feed fuel from the fuel feed device to the catalyst when the temperature of the inflowing exhaust gas is a minimum boiling point of the fuel or less.

16. The exhaust purification system of an internal combustion engine according to claim 8, wherein the control device is configured to detect or estimate a temperature of an inflowing exhaust gas flowing into the catalyst and, if judging that the percentage of soluble organic fractions (SOF) in the particulate matter deposited on the catalyst is the predetermined value or less, feed fuel from the fuel feed device to the catalyst when the temperature of the inflowing exhaust gas is a minimum boiling point of the fuel or less.

17. The exhaust purification system of an internal combustion engine according to claim 1, wherein the fuel feed device is an exhaust fuel injector arranged in the exhaust passage at an upstream side of the catalyst in a direction of exhaust flow, and, if judging that the percentage of soluble organic fractions (SOF) in the particulate matter deposited on the catalyst is the predetermined value or less, the control device is configured to feed fuel from the fuel feed device to the catalyst when the internal combustion engine is in an idling stop state or when it is expected that the internal combustion engine will be in the idling stop state.

18. The exhaust purification system of an internal combustion engine according to claim 1, wherein the control device is configured to detect or estimate a temperature of an inflowing exhaust gas flowing into the catalyst, and, when feeding liquid state fuel from the fuel feed device to the catalyst, increase an feed amount of fuel when the temperature of the inflowing exhaust gas is relatively higher as compared to when the temperature of the inflowing exhaust gas is relatively lower.

* * * * *